Patented Aug. 12, 1941

2,252,271

UNITED STATES PATENT OFFICE 2,252,271

PRODUCT AND PROCESS FOR PLUGGING FORMATIONS

Clyde H. Mathis, Bartlesville, Okla., assignor to Phillips Petroleum Company, a corporation of Delaware No Drawing. Application May 20, 1940, Serial No. 336,262

10 Claims. (Cl. 252—8.5)

This invention relates to a process for the plugging of openings in tanks, walls, dams, etc., plugging formations, particularly those encountered in oil or gas wells and the coating of surfaces.

The invention relates more particularly to the use of an essentially non-acid liquid material which, after in place will undergo condensation, association, polymerization or other chemical reactions to form a resin that will prevent the flow of water, oil and/or gas from or into the formations into which the resinous material has been injected, and generally serves as a sealing agent against flow into or out of tanks, walls, dams and/or from or through any surface whatsoever.

In the drilling of oil and gas wells, water formations are usually encountered during drilling and before the productive oil and gas horizon is contacted. To shut out the water from the bore hole, it is necessary to run steel casing into the well, but in many instances these waters are corrosive and in contacting the steel casing will soon corrode the same allowing the encroachment of water into the well. Also, after an oil well is completed, bottom hole water or water and/or gas is often produced from formations adjacent to the oil saturated formation. This water must be produced from the well bore along with the oil and it materially increases the lifting costs to raise the oil to the surface of the ground since it cuts down the amount of oil which can be produced and further increases the treating costs of the oil when it arrives on the surface of the ground since water must be removed from the oil before it can be processed. In some cases, the production of gas with oil is undesirable. Frequently water is produced with gas in gas wells, which water may be corrosive or exhibit other undesirable features as well as causing high gas-water separating costs. It is often desirable to eliminate the production of water and gas from oil wells from the standpoint of economics.

Heretofore cement and other similar materials have been used in water and gas plugging operations, but these materials offer only a partial solution to these problems, for it is only in the very permeable formations that cement can be forced even under extreme pressures of several thousands of pounds.

In a co-pending application, Serial No. 200,766 by Lerch et al., a resin-forming material for plugging water in formations encountered in oil wells is described. This resin is applicable to use in formations essentially free of limestone or dolomitic materials.

The primary object of this invention is to introduce an essentially acid-free liquid resin-forming material into the formation desired to be plugged in such a manner that a resin by condensation, association, polymerization or other chemical reaction will be formed, thereby plugging the channels in the water and/or gas bearing formation and prevent said water and/or gas from entering the well bore.

A further object of this invention is to provide a process for the sealing of tank bottoms, walls, dam faces, etc., by placing an essentially acid-free liquid resin-forming material on the surface in such a manner that the resin by condensation, association, polymerization or other chemical reaction will be formed thereon.

Other objects and advantages will appear to those skilled in the art from a careful study of the disclosure to follow.

My invention applies to the use of an essentially acid-free liquid resin-forming material which is a homogeneous fluid capable of entering the pores of the formation, and after a predetermined time, will undergo polymerization, association or condensation to form an impermeable solid within the pores of the formation rather than on the surface thereof as cements do.

Generically, the type of improved resin disclosed in this invention is that formed from an ester of a dicarboxylic acid and a polyhydric alcohol, condensed or copolymerized with or without a vinyl derivative, using benzoyl peroxide as a catalyst. The time of set may be controlled by the adjustment of the amount of catalyst added. The constituents of the resin-forming liquid may be varied within wide limits, but in one embodiment of my invention the proportion of dicarboxylic acid-polyhydric alcohol ester is 70 per cent and the proportion of the vinyl derivative is 30 per cent.

In the preferred embodiment of my invention the resin is formed by the reaction of the ester of maleic acid and diethylene glycol with or without vinyl acetate, using benzoyl peroxide as a catalyst.

Diethylene glycol may be replaced by ethylene glycol, similarly, maleic acid may be replaced by oxalic, fumaric, malic, succinic, phthalic, or other dicarboxylic acids for use in the preparation of an ester suitable for use as a resin-forming material as herein described. A vinyl derivative, such as vinyl acetate, may or may not be used depending upon the physical properties of the resin-forming material desired.

It should be understood that this invention makes no claim to the discovery of a new resin or types of resins, but it represents a new and useful application of this general type of resin.

The ester of diethylene glycol and maleic acid is prepared by reacting 110 parts diethylene glycol with 100 parts maleic anhydride. The materials are placed in a closed vat which is equipped with an inlet for carbon dioxide or other inert gas and an air condenser. The vat with the above-mentioned materials are heated to 180° C. for two hours during which time a great amount of refluxing takes place. The reaction mixture is then maintained at 200° C. for 8 hours in the presence of extraneous carbon dioxide. This gas takes no part in the reaction and is introduced to agitate the mixture in the reaction vessel and to carry off water which is formed as one product of the reaction. Other inert gases such as nitrogen may be used equally well. A viscous ester product results which will form a good resin with the addition of benzoyl peroxide as a catalyst, in benzene solution.

Example I

A resin suitable for use in plugging underground formations may be formed from 99 parts of ester, prepared as above described, and one part benzoyl peroxide as catalyst dissolved in benzene. The benzene serves merely as a solvent for the benzoyl peroxide. This mixture will set to form a very hard glass-like product which will render a formation, impregnated with the mixture, impervious to the flow of liquids or gases. The time of set of this mixture will vary with the temperature to which the mixture is subjected in the formation and to the proportion of benzoyl peroxide catalyst used in the mixture, for example in wells having high formation temperatures the resin-forming material should contain much less catalyst than 1 part benzoyl peroxide to 99 parts ester.

Example II

Another example of resin suitable for plugging underground formations is made from 70 parts ester of diethylene glycol and maleic anhydride prepared as heretofore described, 30 parts of vinyl acetate and 1 part benzoyl peroxide as catalyst dissolved in benzene. The 70 parts ester and 30 parts vinyl acetate are well mixed by stirring or other means of mixing at essentially atmospheric temperature, and the benzene solution of benzoyl peroxide added with continued stirring. The mixture should be introduced into the formation immediately after its preparation, and it finally sets to a very hard glass-like product which will render the formation into which it is forced impervious to the flow of liquids or gases. The time of setting of this material will vary with the formation temperature and upon the proportion of benzoyl peroxide catalyst used.

Example III

To the ester resulting from the reaction of 1,120 grams diethylene glycol and 1,000 grams maleic anhydride as above described, was added 30 per cent vinyl acetate and 1 per cent benzoyl peroxide, as catalyst. The catalyst was prepared as a solution by dissolving 1 part benzoyl peroxide in 10 parts benzene. This resin-forming mixture set in 5 hours at 110° F. to a very hard resin. A sample of said mixture remained liquid at refrigerator temperature over night.

Example IV

The resin forming mixture as described in Example III set in 20 hours to a hard resin at 110° F. in the presence of 0.1 per cent benzoyl peroxide catalyst (in benzene solution).

Example V

The ester resulting from the reaction of 1,120 grams diethylene glycol on 1,000 grams maleic anhydride, when catalyzed by one per cent benzoyl peroxide, set at 110° F. in a 6 hour period.

Example VI

An ester may be prepared by heating 75 grams maleic anhydride with 50 grams ethylene glycol for 10 hours at 302–320° F. When an ester thus prepared is mixed with 25 per cent vinyl acetate and one per cent benzoyl peroxide catalyst (in benzene solution) a hard resin is formed in one hour at 150° F. or in 6 hours at 110° F.

By use of the vinyl acetate ingredient a relatively fluid resin-forming mixture results, which because of its relative fluidity, can be more easily forced into the pores of the formations to be plugged.

The above-described resin-forming products are only very slightly acid and show no reaction with limestone (under slight pressure). When a resin is used which is sufficiently acid to react with limestone, the evolved carbon dioxide gas causes agitation within the setting resin and frequently an imperfect resin plug results.

The application of the material to the well bore may be directly through the casing, tubing, bailer or any conventional method suitable for lowering the liquid into the well. If necessary, pressure may be applied through the tubing by positive pump action after a well packer has been set between the tubing and casing above the formation where treatment is desired. After sufficient resin-forming material has been added to the formation, a plug of suitable material may be used to separate the resin-forming material from the oil or water which will follow in the tubing to drive the resin-forming material out into the formation to be plugged and thus insure that the resin-forming material will not set up in the tubing. Pressure will be held on the formation until the liquid material has had sufficient time to form a solid and impermeable resin, plugging the formation.

The setting time of the resin may be varied to fit the particular application, the governing factors being: The depth or extent of the formation, the permeability, porosity and chemical nature of the formation and the available method of application. The setting time is best controlled by the quantity of catalyst present in the mixture.

In conclusion, my invention specifically relates to the use of liquid resin-forming materials with the chemical reaction definitely controlled to produce a solid resin within a controlled time limit so that sufficient time may be allowed to prepare and to introduce the resin-forming material into a well, tank, or to any surface to be treated, before the same resinifies or solidifies. Certain chemical mixtures of materials which will react in this manner have been specifically mentioned but it is to be understood that other compounds or mixtures containing the same physical and chemical properties as those specifically mentioned will react in the same manner as those mentioned above and that various changes in the choice and amounts of materials used can be made without departing from the spirit of my invention or the scope of the subjoined claims.

I claim:

1. A method of plugging formations in wells comprising introducing into the well a liquid composition which consists of a mixture of an ester of a dicarboxylic acid and a polyhydric alcohol and controlling the time of set of the liquid by the addition of a benzoyl peroxide catalyst to the liquid composition.

2. A method of plugging formations in wells comprising introducing into the well a liquid composition which consists of a mixture of an ester of a dicarboxylic acid and a polyhydric alcohol with a vinyl derivative added thereto and controlling the time of set of the liquid by the addition of a benzoyl peroxide catalyst to the liquid composition.

3. A method of plugging formations in wells comprising introducing into the well a liquid composition which consists of a mixture of an ester of maleic acid and a polyhydric alcohol and controlling the time of set of the liquid by the addition of a benzoyl peroxide catalyst to the liquid composition.

4. A method of plugging formations in wells comprising introducing into the well a liquid composition which consists of a mixture of an ester of maleic acid and a polyhydric alcohol with a vinyl derivative added thereto and controlling the time of set of the liquid by the addition of a benzoyl peroxide catalyst to the liquid composition.

5. A method of plugging formations in wells comprising introducing into the well a liquid composition which consists of a mixture of an ester of a dicarboxylic acid and diethylene glycol and controlling the time of set of the liquid by the addition of a benzoyl peroxide catalyst to the liquid composition.

6. A method of plugging formations in wells comprising introducing into the well a liquid composition which consists of a mixture of an ester of a dicarboxylic acid and diethylene glycol with a vinyl derivative added thereto and controlling the time of set of the liquid by the addition of a benzoyl peroxide catalyst to the liquid composition.

7. A method of plugging formations in wells comprising introducing into the well a liquid composition which consists of a mixture of an ester of maleic acid and diethylene glycol and controlling the time of set of the liquid by the addition of a benzoyl peroxide catalyst to the liquid composition.

8. A method of plugging formations in wells comprising introducing into the well a liquid composition which consists of a mixture of an ester of maleic acid and diethylene glycol with a vinyl derivative added thereto and controlling the time of set of the liquid by the addition of a benzoyl peroxide catalyst to the liquid composition.

9. A method of plugging formations in wells comprising introducing into the well a liquid composition which consists of a mixture of 99 parts of an ester of maleic acid and diethylene glycol and controlling the time of set of the liquid by the addition of 1 part of a benzoyl peroxide catalyst to the liquid composition.

10. A method of plugging formations in wells comprising introducing into the well a liquid composition which consists of a mixture of 70 parts of an ester of maleic acid and diethylene glycol with 30 parts of a vinyl derivative added thereto and controlling the time of set of the liquid by the addition of 1 part of benzoyl peroxide catalyst to the liquid composition.

CLYDE H. MATHIS.